(12) United States Patent
Choulet

(10) Patent No.: US 9,336,465 B2
(45) Date of Patent: May 10, 2016

(54) METHOD AND APPARATUS FOR COLOR PRINT MANAGEMENT

(71) Applicant: ELECTRONICS FOR IMAGING, INC., Foster City, CA (US)

(72) Inventor: Luc Choulet, Charnay les Macon (FR)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 2 days.

(21) Appl. No.: 13/843,768

(22) Filed: Mar. 15, 2013

(65) Prior Publication Data

US 2014/0268193 A1 Sep. 18, 2014

(51) Int. Cl.
*H04N 1/40* (2006.01)
*G06K 15/02* (2006.01)

(52) U.S. Cl.
CPC .................................. *G06K 15/027* (2013.01)

(58) Field of Classification Search
CPC ... H04N 1/6011; H04N 1/60; H04N 1/00132; H04N 1/00172; H04N 1/00188; H04N 1/00161; H04N 1/00167; H04N 1/603; H04N 1/6013; H04N 1/622; H04N 1/6052; H04N 1/6058; G06F 3/1256; G06F 3/1253
USPC ........... 358/1.9, 2.1, 504, 500, 406, 515–523, 358/527, 529; 382/162–167
See application file for complete search history.

(56) References Cited

U.S. PATENT DOCUMENTS

| | | | |
|---|---|---|---|
| 5,142,337 | A | 8/1992 | Karidis et al. |
| 5,822,503 | A | 10/1998 | Gass et al. |
| 6,944,334 | B2 | 9/2005 | Piatt et al. |
| 7,920,297 | B2 | 4/2011 | Doggett, III et al. |
| 8,743,137 | B2 * | 6/2014 | Peters et al. .................. 345/593 |
| 2003/0098986 | A1 | 5/2003 | Pop |
| 2004/0027416 | A1 | 2/2004 | Rosenberger et al. |
| 2004/0051874 | A1 | 3/2004 | Kubitzek et al. |
| 2004/0233463 | A1 | 11/2004 | Hersch et al. |
| 2005/0286085 | A1 | 12/2005 | Lee |
| 2006/0082844 | A1 | 4/2006 | White |
| 2007/0201062 | A1 | 8/2007 | Watanabe |
| 2010/0177327 | A1 | 7/2010 | Maheshwari |
| 2011/0234660 | A1 | 9/2011 | Yoshida |
| 2012/0081461 | A1 | 4/2012 | Kakutani |
| 2012/0105882 | A1 | 5/2012 | Horita et al. |
| 2012/0263512 | A1 | 10/2012 | Sakai et al. |

FOREIGN PATENT DOCUMENTS

FR   2983951 A1   6/2013

OTHER PUBLICATIONS

Stone, et al., "Color Gamut Mapping and the Printing of Digital Color Images", (1988)Journal of ACM Transactions on Graphics (TOG). vol. 7, Issue 4, 44 Pages.
"ColorThink Pro", CHROMiX ColorThink, retrieved online on Mar. 12, 2013 from url: http://www2.chromix.com/colorthink/pro/pro_colorcast; 2 pages, undated, 2 pages.

* cited by examiner

*Primary Examiner* — Thomas D Lee
*Assistant Examiner* — Stephen M Brinich
(74) *Attorney, Agent, or Firm* — Perkins Coie LLP

(57) ABSTRACT

In a color printing environment, functions for printing color management are dissociated. An abstraction layer is also provided to facilitate setting and evaluation of all factors relating to color print and prediction.

2 Claims, 14 Drawing Sheets

METHOD AND APPARATUS FOR COLOR PRINT MANAGEMENT

BACKGROUND OF THE INVENTION

1. Technical Field

The invention relates to color printing. More particularly, the invention relates to color print management.

2. Description of the Background Art

State of the art color management systems try to solve all of the challenges of color management in the context of printing in a few operations and with minimum color definition. However, a color management workflow for printing must address the following operations:

- Gamut adaptation between the source space and the printing space;
- Color separation strategy, especially if the color space has more than three dimensions, such as CMYK;
- Linearization for each ink to make response similar to a fixed standard;
- Ink limitations, such as maximum ink volume per channel and in (n) dimensions of combinations per channel; and
- Image and/or color adaptation, e.g. manual correction with software or fixed correction with algorithmic functions and/or look-up tables (LUT).

While some of the foregoing operations could be included in one color LUT, such as an ICC profile, such technology is static. If it is desired to change or make a dynamic gamut adaptation, then all of these operations must be separated.

Further, for all color printing processes, it is necessary to decompose the color image information to be printed in each printing unit with respect to:

- The colorimetric inks, also referred to as primary colors; and
- Print settings, such as frame sequence, support, finishing, etc.

Such decomposition of the color image is referred to as separation. The best known separation is CMYK (Cyan, Magenta, Yellow, Black), but separation can also involve other primary colors, e.g. Blue, Brown, Yellow, Black, and/or involve more than four primary colors, e.g. Hexachrome C, M, Y, K, Orange, Green. The final expectations of the artist/client provide a good correspondence between the image to be used for printing, as validated before printing, and the image that results after printing.

There are solutions that enable digital proofing, e.g. on paper, of separate files through a clear definition of colorimetric mixture layers. Generally used technology involves the use of a look-up table (LUT) for storing values in a profile connection space (PCS), such as the XYZ or CIELab color space, for example in an ICC color profile or equivalent. Each change in values of a layer in percentage (%) of ink has a repercussion on the final color. To adjust the aesthetic image in the context of its final result, it is common to change the channel values, e.g. CMYK, with editing software and visualization, for example by use of an editing program, such as Adobe Photoshop. In the CMYK space, operators usually have experience doing this and the correction is easy to understand because it is based on three primary colors and the impact of such primary colors on complementary colors. For example, Red consists of Magenta and Yellow.

Changing the Red, in turn, acts on the information concerning Magenta and Yellow. For further example, clarity is often defined by the layer of Black and/or by the combined action of three layers trichrome (C, M, Y).

Changing the separation values, e.g. CMYK or nCLR (≥4 CLR) for aesthetic reasons can lead to problems during printing. For example, the operator can increase the total ink (TIL: Total Ink Limit) and create problems with drying and/or with the inks that are required. Thus, in the case of use of color away from traditional CMYK primaries, for example Blue, Red, Green, Yellow, the actions necessary to retouch the image are different from those known by experience and the learning process is long and must be repeated for each new configuration of ink.

In the case of a separation of more than four colors (nCLR), for example using as the four first colors, colors that are similar to those of the CMYK color space, even if the colors are different, the correction on separate layers becomes very complex for the operator. For example, the color "flesh" in Hexachrome OG may involve Orange, Yellow, Magenta, Black, and Cyan. Inappropriate modifications of the Orange or Magenta or Yellow layer can cause visible artifacts in the image.

Further, the color effect for data types that are achromatic such as, for example white ink for printing on a colored support, e.g. type Brown cardboard; transparent varnish matt, gloss, satin, etc.; and metallic ink, e.g. Silver ink, are not very easily visible if the separation algorithm achieves results that are perceived as natural and qualitative by the observer. For some creative operations, it may be necessary for the creative work on, for example a virtual file as disclosed herein to view the presence, location, and quantity of a particular ink, i.e. Silver ink, before separation, given that the amount of this ink is automatically calculated by subsequent separation technology, based on color information defined in the virtual space, combined with a strategy of color separation (CSS: Color Separation Strategy). Silver ink, for example, when viewed at certain angles between the light and the observer, is seen as having a color medium gray, as a gray ink of the same color, but without the specular effect made by the metallic pigments. In virtual space—with only one image or with a static image—it is difficult, when visualizing a 2D image on a screen, to determine if the color medium gray is a shade of black ink or if it is a shade of Silver ink.

Additionally, when the chromatic adaptation and management of out-of-gamut colors, for example all the values that must be separated, are in gamut there is a unique relationship between a color of type CIELab, XYZ, or equivalent and a space (n) dimension, i.e. if colors are in-gamut then there is a unique relationship between the device independent color space (CIELab, XYZ) and colorants. Note that this is not true if there are more than three colorants. Different CMYK combinations can have the same CIELab or XYZ. However, for purposes of the invention herein, this is true in the disclosed virtual space. The use of an encoding of type LCh (Lightness/clarity-Chroma/Saturation-hue/tint) is in compliance with a representation of color space and can result from a number of decisions based upon experience or from analysis of colorimetric data. One problem comes from the fact that it is difficult to establish relationships of colors, depending on the pigment inks, the color of the substrate, etc., when the color source, working from data coded L*C*h, is an area of size that is variable and not constant.

Finally, for any printing process which has a post-printing operation (PPO), such as varnish, lamination, kiln, etc., the printer operator and the customer cannot decide in advance of the PPO if the printing result achieved after the PPO will be correct. In such case, all of the adjustments that concern color, e.g. density, dot gain, etc. are made during the printing process and give a visible result before the PPO. Usually, the PPO is not available immediately but, rather, is only available some hours or days afterward. However, the PPO typically generates some color differences, e.g. kiln influences for ceramic substrates, or influences the human perception of the color, for example due a glossy difference. The customer wants to have a final production, i.e. after the PPO, in accordance with his artwork and/or physical proof, based upon a visual comparison between the current print and the reference proof. Unfortunately, the printer proof only shows the final result, and not the result before the PPO.

SUMMARY OF THE INVENTION

Embodiments of the invention relate to dissociation of functions for printing color management.

In another embodiment, an abstraction layer is used to facilitate setting and evaluation of all factors relating to color print and prediction. Thus, an embodiment of the invention relates to the use of a virtual space, such as the virtual space for processing color matching and editing.

An embodiment of the invention uses virtual space editing, referred to herein as "vRGB" (if used in RGB space). Virtual space allows full color representation of a file, as well as the representation of certain influences color inks and/or treatment, e.g. clear varnish.

An embodiment of the invention allows one to view this ink separately, thus generating a second virtual color profile, which contains only the color values relative to the ink concerned.

In another embodiment of the invention, the color values corresponding to a source from a known and defined space are matched to a predefined treatment. This embodiment of the invention thus establishes a relationships between the strategy of separation and the virtual color values (stable) and can therefore establish algorithmically a unique relationship between the vLCh (virtual LCH) and (n)CLR data. It is then necessary to establish a relationship ["3D to 3D"] between the actual measured (CIELab) colorimetric data and imaginary colorimetric data (or virtual type vLCh) to establish the relationship with the source data. This relationship is established by a LUT with interpolation of the data between the anchor points of the LUT. A 3D/3D LUT is therefore optimal in terms of precision/size/time, easy to achieve, and requires only one data source, and does not require management of multiple (n)-dimension space-induced combinations. This vLCh space also has a single match ["3D to 3D"] with the virtual editing space regardless of size.

In another embodiment of the invention, the result after printing is measured before any PPO. In this embodiment, a color definition, similar to an ICC profile, is created to show and proof the result that can be obtained by the PPO, when the customer and printer operator need to decide if the production could be validated before the PPO.

DETAILED DESCRIPTION OF THE INVENTION

Dissociation of Functions for Printing Color Management

An embodiment of the invention relates to dissociation of functions for printing color management. An embodiment thus provides a color workflow, in which separate and independent operator adjustment of operations is provides, including setting gamut adaptation between a source space and a printing space; establishing a color separation strategy; effecting linearization for each ink to make response similar to a fixed standard; adjusting for ink limitations, including maximum ink volume per channel and in (n) dimensions of combinations per channel; and effecting image and/or color adaptation.

As discussed above, state of the art color management systems try to solve all of the challenges of color management in the context of printing in a few operations and with minimum color definition. However, the above-described embodiment of the invention recognizes that a color management workflow for printing must address the following operations:

Gamut adaptation between the source space and the printing space;

Color separation strategy, especially if the color space has more than three dimensions, such as CMYK;

Linearization for each ink to make response similar to a fixed standard;

Ink limitations, such as maximum ink volume per channel and in (n) dimensions of combinations per channel; and Image and/or color adaptation, e.g. manual correction with software or fixed correction with algorithmic functions and/or look-up tables (LUT).

While some of the foregoing operations could be included in one color LUT, such as an ICC profile, such technology is static. If it is desired to change or make a dynamic gamut adaptation, then all of these operations must be separated.

Additional benefits are realized in a system which uses high-bit floating point or fixed point data and math for high precision. ICC profiles by their very nature are quantized and so introduce errors by interpolation. Using an ICC profile for virtual viewing still has these issues, but processing of the image data for production need not go through quantized lookup tables and can therefore be more accurate. This is particularly true when using a spectral model.

Figure 1:
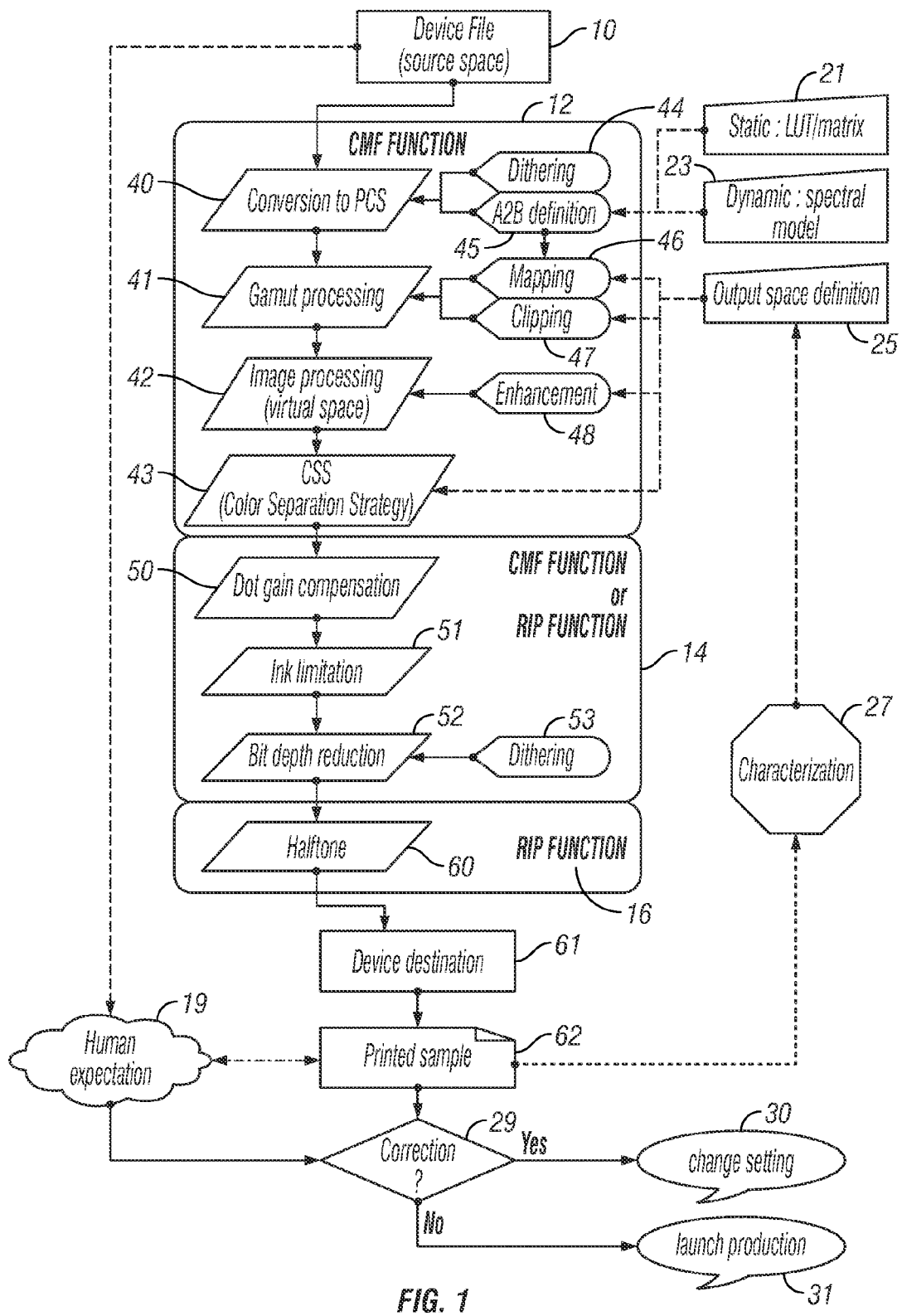
FIG. 1 is a flow diagram showing a color management workflow according to the invention.

FIG. 1 is a flow diagram showing a color management workflow according to the invention. As can be seen from FIG. 1, each operation in a color management workflow is separated. As shown in FIG. 1, print management functions are divided between the color management function (CMF) 12, the CMF function or raster image processor function (RIP) 14, and the RIP function 16. Thus, an embodiment of the invention, for example, defines the color separation strategy (CSS) 43 as a standalone function, which is useful for virtual space and multicolor separation. Those skilled in the art will appreciate that the CSS can also be partially or entirely located in the CMF, RIP, or both the CMF and RIP.

As shown in FIG. 1, a device source 10, such as a file to be printed, is provided to the CMF function. In an embodiment, the file is converted to a profile connection space (PCS), such as L*a*b* 40 with a dithering option 44 and A2B definitions 45 are applied, the A2B definitions being any of static definitions from a look-up table (LUT) or matrix 21, or dynamic definitions from, for example, a spectral model 23.

Thereafter, gamut processing 41, image processing in a virtual space (as discussed below) 42, and the CSS 43 work together, i.e. are linked. Gamut mapping comprises a mapping function 46 which is determined, at least in part, by any of the A2B, i.e. device to PCS (or color space), definition and an output space definition 25 (which is part of an overall characterization 27); and a clipping function 47. While mapping and clipping take place together in some embodiments, with final mapping taking place after clipping, in other embodiments clipping is performed first and, thereafter, mapping is performed, as in compression.

Image processing optionally includes an enhancement component 48 based, at least in part, upon an output space definition 25 (which is part of an overall characterization 27).

The output of the CSS function then proceeds for further processing at either a continuation of the CMF function or as part of the RIP function. Functions that are applied to the file can optionally include dot gain compensation 50, consideration of ink limitations 51, and bit depth reduction 52, if appropriate, and subject to dithering 53.

The RIP function also applies, if necessary, a halftone function 60.

A device destination is determined 61 and a printed sample is produced 62, which is used for the output characterization 27. Color perception is reviewed to meet human expectations 19 with regard to the output and a determination is made if corrections are needed 29. If corrections are required 30, then the particular function is adjusted. An important feature of the invention is the ability to adjust each of the several print workflow functions independently.

If corrections are not required, then the product is printed 31 after validation of the first sample.

The herein disclosed color management workflow allows device developers to add their own gamut mapping algorithm into the workflow to customize the color response of the device. Embodiments of the invention also allow the performance of some image processing with no dependency of the number of colors used by the color separation.

Virtual Space for Processing Color Matching and Editing

Figure 2:
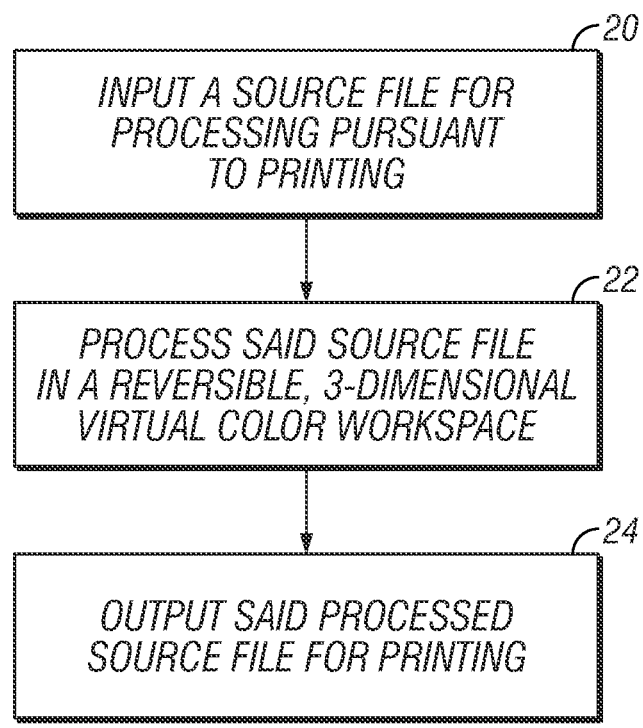
FIG. 2 is a flow diagram that shows the use of virtual space for processing color matching and editing according to the invention.

An embodiment of the invention relates to the use of a virtual space, such as the virtual space 42 shown in FIG. 1, for processing color matching and editing. FIG. 2 is a flow diagram that shows the use of virtual space for processing color matching and editing according to the invention. Thus, a method of processing color matching and editing is disclosed that comprises inputting a source file for processing pursuant to printing 20. The source file is processed 22 in a reversible, three-dimensional virtual color space comprising a virtual workspace between said virtual color space and a printing space having "n" data size of % separation (nCLR), where the % of each color is equivalent to a single virtual color having separation values necessary to obtain an expected color rendering before separation into separate layers for printing, wherein changing the % effects display of a resulting color rendering. Thereafter, the processed source file is output for printing 24.

As discussed above, for all color printing processes, it is necessary to decompose the color image information to be printed in each printing unit with respect to:

The colorimetric inks, also referred to as primary colors; and

Print settings, such as halftone, ink sequence, media, finishing, etc.

Such decomposition of the color image is referred to as separation. The best known separation is CMYK (Cyan, Magenta, Yellow, Black), but separation can also involve other primary colors, e.g. Blue, Brown, Yellow, Black, and/or involve more than four primary colors, e.g. Hexachrome C, M, Y, K, Orange, Green. The final expectations of the artist/client is to provide a good correspondence between the image to be used for printing, as validated before printing, and the image that results after printing.

There are solutions that enable digital proofing, e.g. on paper, of separate files through a clear definition of colorimetric mixture layers. Generally used technology involves a LUT to PCS (XYZ or CIELab), such as L*C*h or equivalent. Each change in values of a layer in percentage (%) of ink has a repercussion on the final color. To adjust the aesthetic image in the context of its final result, it is common to change the channel values, e.g. CMYK, with editing software and visualization, for example by use of an editing program, such as Adobe Photoshop. In the CMYK space, operators usually have experience doing this and the correction is easy to understand because it is based on three primary colors and the impact of such primary colors on complementary colors. For example, in printing, Red consists of mixing Magenta and Yellow. Changing the Red, in turn, acts on the information concerning Magenta and Yellow. For further example, clarity is often defined by the layer of Black and/or by the combined action of three layers trichrome (C, M, Y).

Changing the separation values, e.g. CMYK or nCLR ($\geq 4$ CLR) for aesthetic reasons can lead to problems during printing. Thus, an operator who is performing a modification and/or adaptation in such color spaces must have specific knowledge of the behavior of each and every ink that is used. Assuming that a particular ink is more opaque than another, it is not possible to predict what results such modification and/or adaptation in a particular color space would produce on the output side. In accordance with an embodiment of the invention, an operator who performs such modification and/or adaptation in the herein disclosed vRGB space eliminates the above discussed issues because the vRGB space includes such knowledge already and the operator only changes RGB values and not a certain ink channel.

For example, the operator can increase the total ink (TIL: Total Ink Limit) and create unwanted problems with drying and/or with the inks that are required. Thus, in the case of use of color away from traditional CMYK primaries, for example Blue, Red, Green, Yellow, the actions necessary to retouch the image are different from those known by experience and the learning process is long and must be repeated for each new configuration of ink.

In the case of a separation of more than four colors (nCLR) and using the CMYK colors, even if the CMYK colors are different, the correction on separate layers becomes very complex for the operator. For example, the color "flesh" in Hexachrome OG may involve Orange, Yellow, Magenta, Black, and Cyan. Inappropriate modifications of the Orange or Magenta or Yellow layer can cause visible artifacts in the image and/or printing problems.

Figure 3:
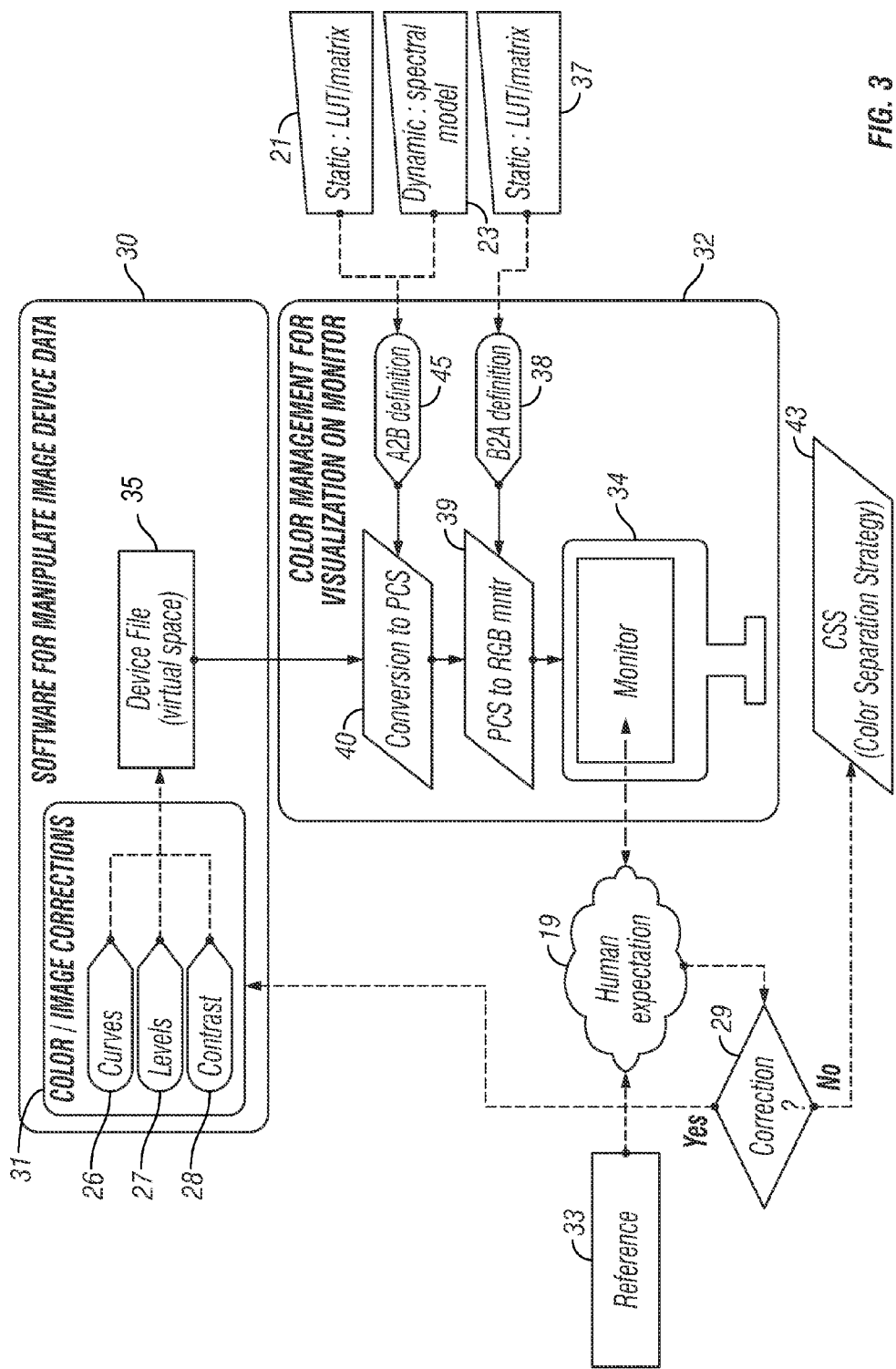
FIG. 3 is a block schematic diagram that shows a system making simple, reliable, and safe actions in retouching images possible while viewing the color rendering after printing according to the invention.

Embodiments of the invention address the foregoing problems by separating the objective, i.e. what is desired by the customer, from the means, i.e. what can be achieved by the printer, by making simple, reliable, and safe actions in retouching images possible while viewing the color rendering after printing (see FIG. 3). In this regard, it is noted that all colors achievable by mixing inks (%) are measurable and quantifiable in a three-dimensional (3D) color space, e.g. CIELab, XYZ, etc.

FIG. 3 is a block schematic diagram that shows a system making simple, reliable, and safe actions in retouching images possible while viewing the color rendering after printing according to the invention. In FIG. 3, software for manipulating image device data 30 provides functions for color and image corrections 31 that include curves 26, levels 27, and contrast 28. These corrections are applied to a device file in virtual space 35.

The adjusted device file is provided to a color management module for visualization of the file on a monitor 32, in which the device file is converted to PCS 40 in accordance with an A2B definition 45, for example, based upon static parameters from an LUT or matrix 21 and/or dynamic parameters from a spectral model 23. The PCS file is then converted to, for example, an RGB monitor color space 39 in accordance with a B2A definition 38 that is based upon, for example, parameters in an LUT or matrix 37.

The file thus processed is provided to a monitor 34, where it can be compared with a reference 33 by a user to determine if the results meet human expectations 19. If corrections are needed 29, then the process herein described is repeated, else the parameters thus determined are used in the color separation strategy 43.

In an embodiment of the invention there is a version of imaginary color space that is a surrogate for real color space. This version of imaginary color space is easy to manipulate over the real version (color) of the file. Embodiments of the invention thus comprise establishing a unique and reversible 3D or greater (nD), e.g. 4D, color space between the space and "n" data size of % separation (nCLR) and between the 3D color space and a virtual space % 3D. In such case, it is possible to change the % to see the resulting color rendering, where the % of each color is equivalent to a single virtual color with the separation values necessary for obtaining the expected color rendering. It is also possible with a 3D color space to see a change in % 4D virtual space, if any combination of the 4D space gives a unique response in a 3D space. Whatever the number of colors used in printing, in an embodiment the operator always works in a single 3D space, which simplifies learning. In addition, all the colors that the operator sees are easily printable, i.e. there is no out-of-gamut or excessive ink problem. A key point in this embodiment of the invention is that the nD color space is hard to understand so it is mapped to a 3D virtual color space called vRGB and done in a way that makes it easy to understand. The gamut of this vRGB space is the same as the nCLR space. In some areas it is clipped (or flat) so that the user cannot edit to create colors that cannot be reproduced on the nCLR device. That is, the vRGB space enables WYSIWYG to the extent that the monitor gamut allows.

To be compatible with existing software in the market, e.g. Adobe Photoshop, an embodiment of the invention retains only the three space dimensions that are not supported by Photoshop color, namely the RGB space. In an embodiment of the invention, the color space could also be a CMY (without K) space if supported by Photoshop. Thus, embodiments of the invention can also use the CMYK space without including the Black channel.

The invention establishes a unique relationship that is reversible, and it is also possible to convert the 3D virtual space into 4D space virtual and make it more in line with the features found in CMYK graphics software.

By definition, the virtual space is not limited to a fixed number of layers. Simply, all information and editing actions on virtual layers serve only to modify the color values and so, consequently, the values of separations required to obtain the final result.

The color display of the virtual space is effected by technology color management, dynamic 23 (FIG. 1) or static type 21 (FIG. 1). The best known and most compatible to technology date is that of ICC profiles. Creation of an ICC profile with a table to Peripheral PCS (A2Bx) 45 (FIG. 1) is performed in the virtual color space (3, 4, or more). This color space is used as virtual workspace for the creative. It is therefore necessary to convert (color matching operation) the colors of the source files (source space) in a virtual space which has the same color space as the (n) colors used for printing.

Thus, embodiments of the invention provide a virtual 3D space to (n)D for precise handling and simplified rendering of color after printing, whatever the dimension of the output space. Space conversion of the source 10 (FIG. 1) in virtual space for discussion, editing, and proofing occurs before separation in separate layers for printing.

Visualizing Dedicated Layer in Virtual Space

Figure 4:
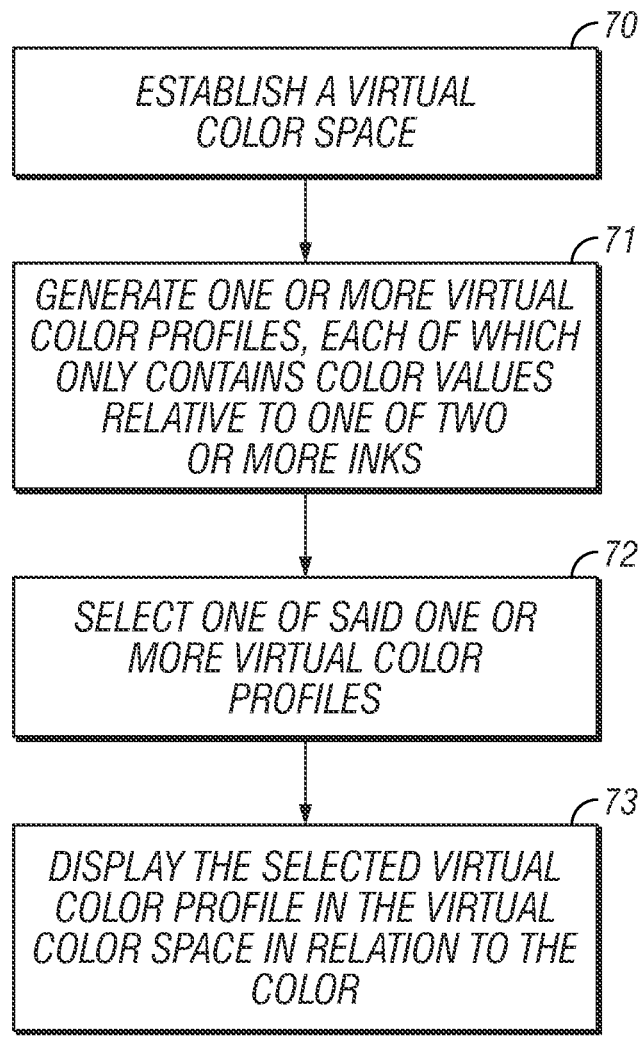
FIG. 4 is a flow diagram that shows the use of visualizing a dedicated layer in virtual space according to the invention.

FIG. 4 is a flow diagram that shows the use of visualizing a dedicated layer in virtual space according to the invention. This embodiment of the invention is related to the virtual space 42 for processing color matching and editing embodiment, discussed above in connection with FIG. 1. Those skilled in the art will appreciate that this embodiment of the invention is also applicable for non-color values, such as gloss value, specular value, etc. An embodiment of the invention uses virtual space editing, referred to herein as "vRGB" (if used in RGB space).

In the embodiment of the invention shown in FIG. 4, a method for visualizing a dedicated ink layer in a color is provided, in which a virtual color space is established 70; one or more virtual color profiles are generated, each of which only contains color values relative to one of the two or more inks 71; one of the one or more virtual color profiles is selected 72; and the selected virtual color profile is displayed in the virtual color space in relation to the color 73. Thus, adjustment of the selected profile displays a visualization of the ink as modified by the adjustment.

Virtual space allows full color representation of a file, as well as the representation of certain influences color inks and/or treatment, e.g. clear varnish. The invention finds use for data types that are achromatic such as, for example:

White ink for printing on a colored support, e.g. type Brown cardboard;

Transparent varnish matt, gloss, satin, etc.; and

Metallic ink, e.g. Silver ink.

The color effect of these parameters is not very easily visible if the separation algorithm achieves results that are perceived as natural and qualitative by the observer. For some creative operations, it may be necessary for the creative work on the virtual file to view the presence, location and quantity of a particular ink, i.e. Silver as a color or specular effect, before separation, given that the amount of this ink is automatically calculated by subsequent separation technology, based on color information defined in the virtual space, combined with a strategy of color separation (CSS: Color Separation Strategy). Silver ink, for example, is seen as having a color medium gray, as a gray ink of the same color, but without the side specular metallic pigments. In virtual space, it is impossible, when visualizing the 2D image on a screen, to determine whether the gray is a shade of black ink or shade of ink Silver.

An embodiment of the invention allows one to view this ink separately, thus generating a second virtual color profile, which contains only the color values relative to the ink concerned. In contrast, the state of the art uses an N-profile for viewing specific channels, but currently standard applications do not support this kind of profile and its size can be quite large if it is to provide reasonable accuracy.

Accordingly, an embodiment of the invention allows one to view:

A specific ink separately, without the other inks/colors, to validate the areas which are concerned, e.g. for silver, varnish, and/or white inks;

The global rendering under another observer angle to see the influence of the specular effect, e.g. for silver, varnish, and/or other inks);

All of the other colors without the specific inks, to validate the visual and color rendering without this additional ink.

Thus, an aspect embodiment generates a virtual color profile, which contains only the color values relative to a context previously defined.

This is accomplished either by a standard static LUT technology, such as an ICC profile, or by a dynamic technology LUT in which parameters are set by the user, on the basis of color data and/or spectro-colorimetric information, and by means of a plug-in and/or a dedicated application. By using this particular profile, e.g. under Adobe Photoshop (PSD), one can directly visualize areas and nuances involved in the selected layer. With the invention, it is possible to generate and use as many desired specific virtual profiles in relation to the special colors that the user wishes to see (see FIGS. 5A and 5B).

Figure 5A:
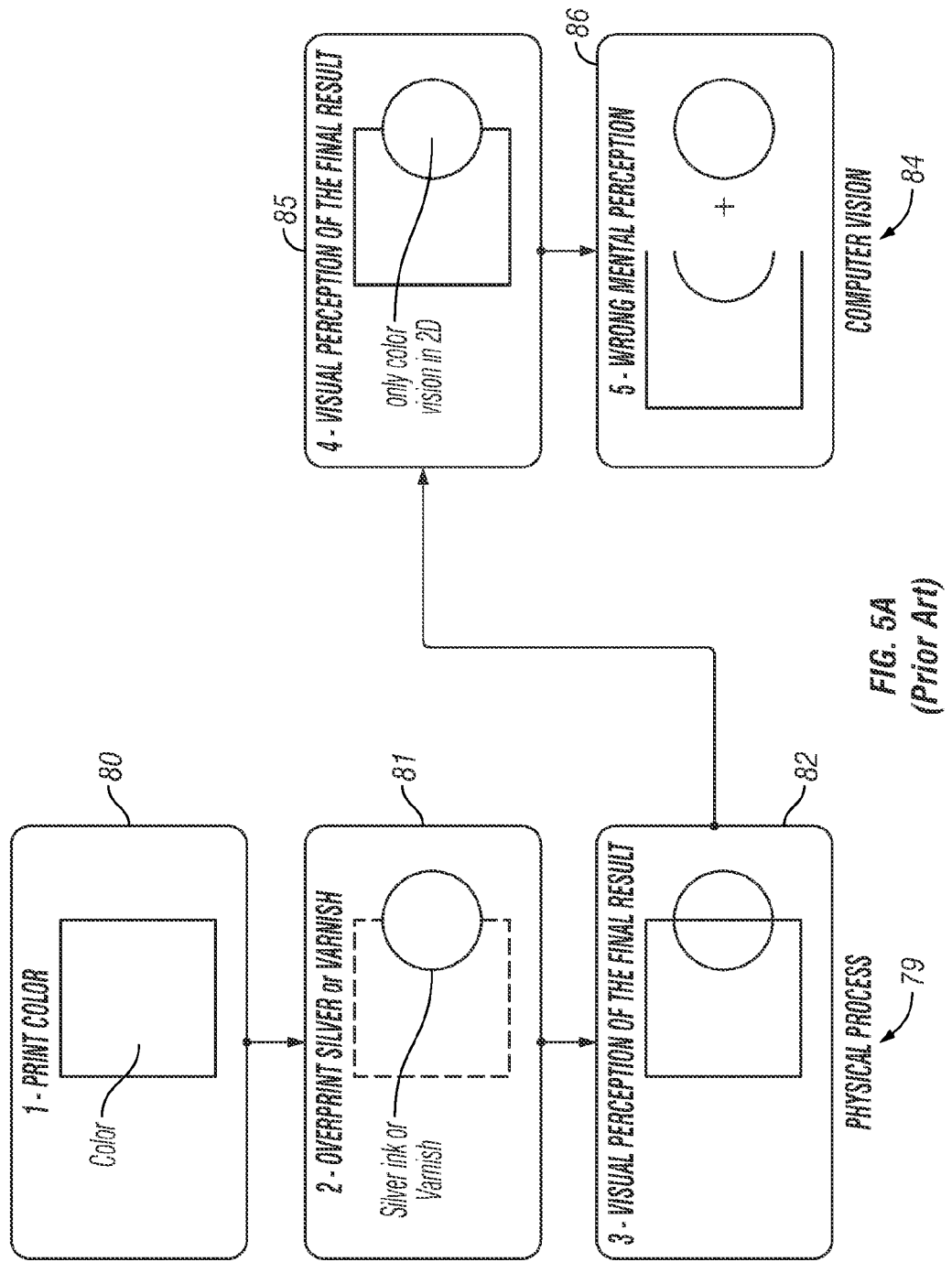
FIG. 5A is a block schematic diagram showing the state of the art with regard to visualization of special colors.
Figure 5B:
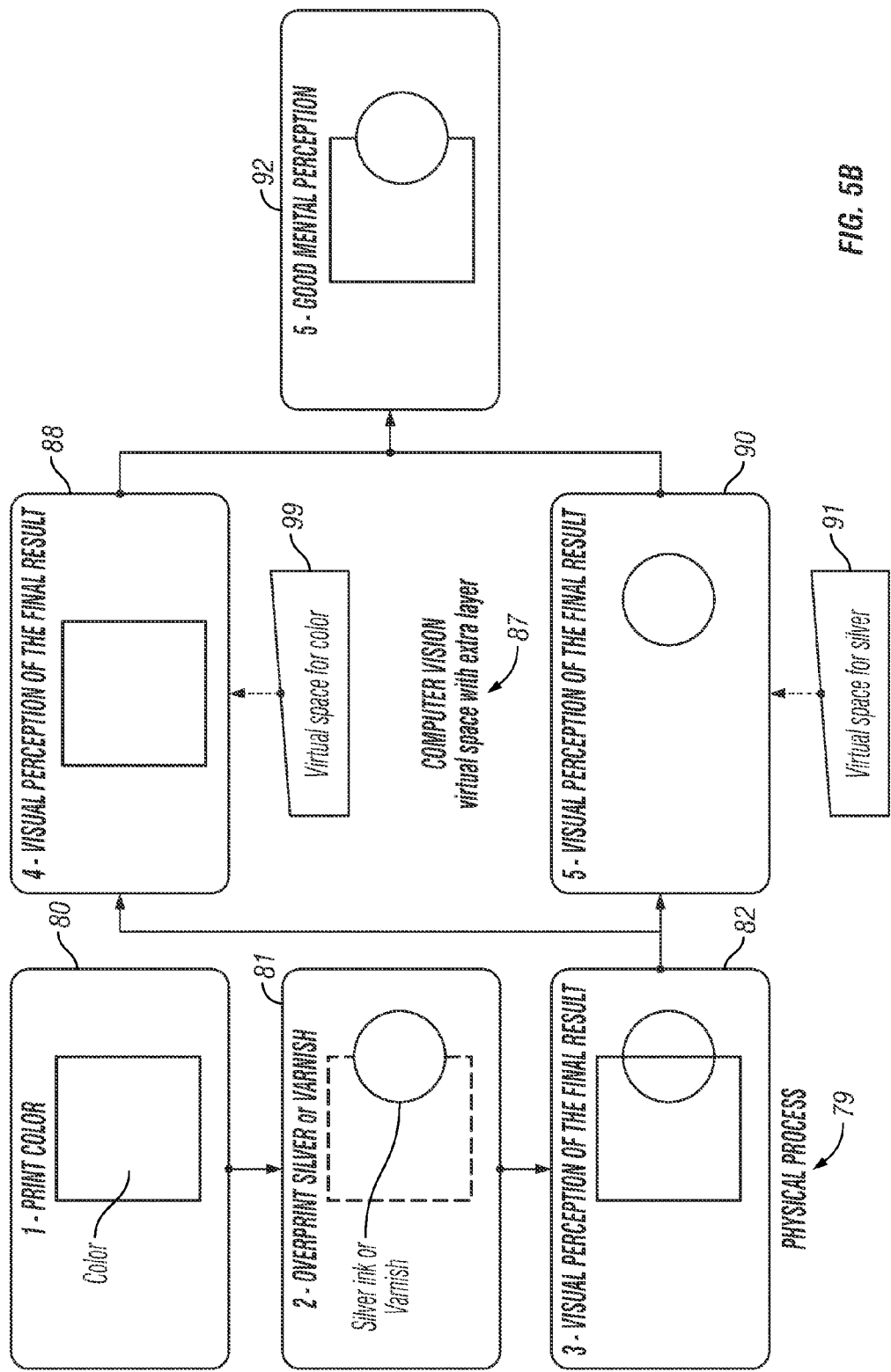
FIG. 5B is a block schematic diagram showing visualization of special colors according to the invention.

FIG. 5A is a block schematic diagram showing the state of the art with regard to visualization of special colors; and FIG. 5B is a block schematic diagram showing visualization of special colors according to the invention.

In FIG. 5A, the physical print process 79 involves printing a color 80, overprinting the color, for example with silver ink or varnish 81, and the visual perception of the final result 82. The computer vision of the print 84, based upon the visual perception of the final result as adjusted in 2D color space 85 produces the wrong mental perception 86.

In FIG. 5B, the physical print process 79 involves printing a color 80, overprinting the color, for example with silver ink or varnish 81, and the visual perception of the final result 82. However, in an embodiment of the invention, the computer vision comprises a virtual space which accounts for the extra print layer 87, such that one visual perception of the final result 88 includes a virtual space for color 99 and another visual perception of the final result 90 includes a virtual space for the overprinted color, here, silver 91. As a result, the print process produces a good mental perception 92.

Predictive Virtual Space

Figure 6:
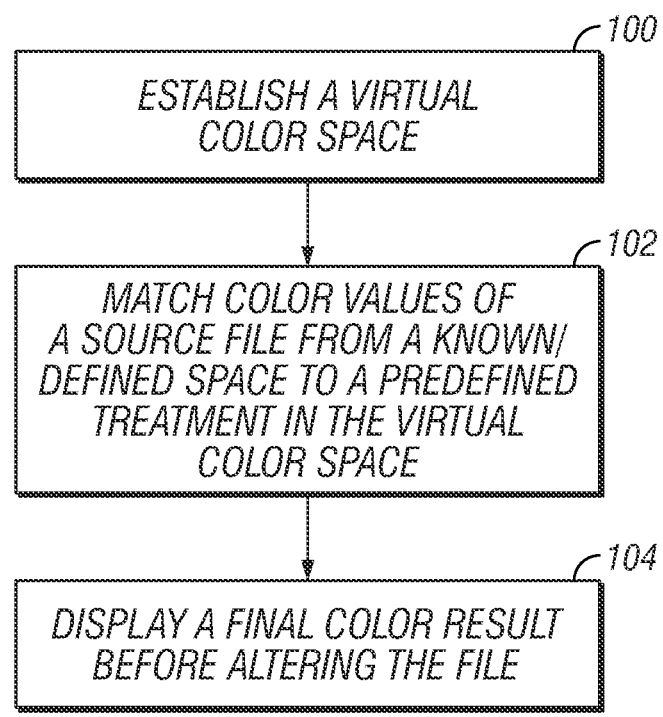
FIG. 6 is a flow diagram that shows the use of predictive virtual space according to the invention.

FIG. 6 is a flow diagram that shows the use of predictive virtual space according to the invention. This embodiment of the invention is related to the virtual space 42 for processing color matching and editing embodiment, discussed above in connection with FIG. 1. An embodiment of the invention uses virtual space editing, referred to herein as "vRGB" (if used in RGB space).

Figure 7A:
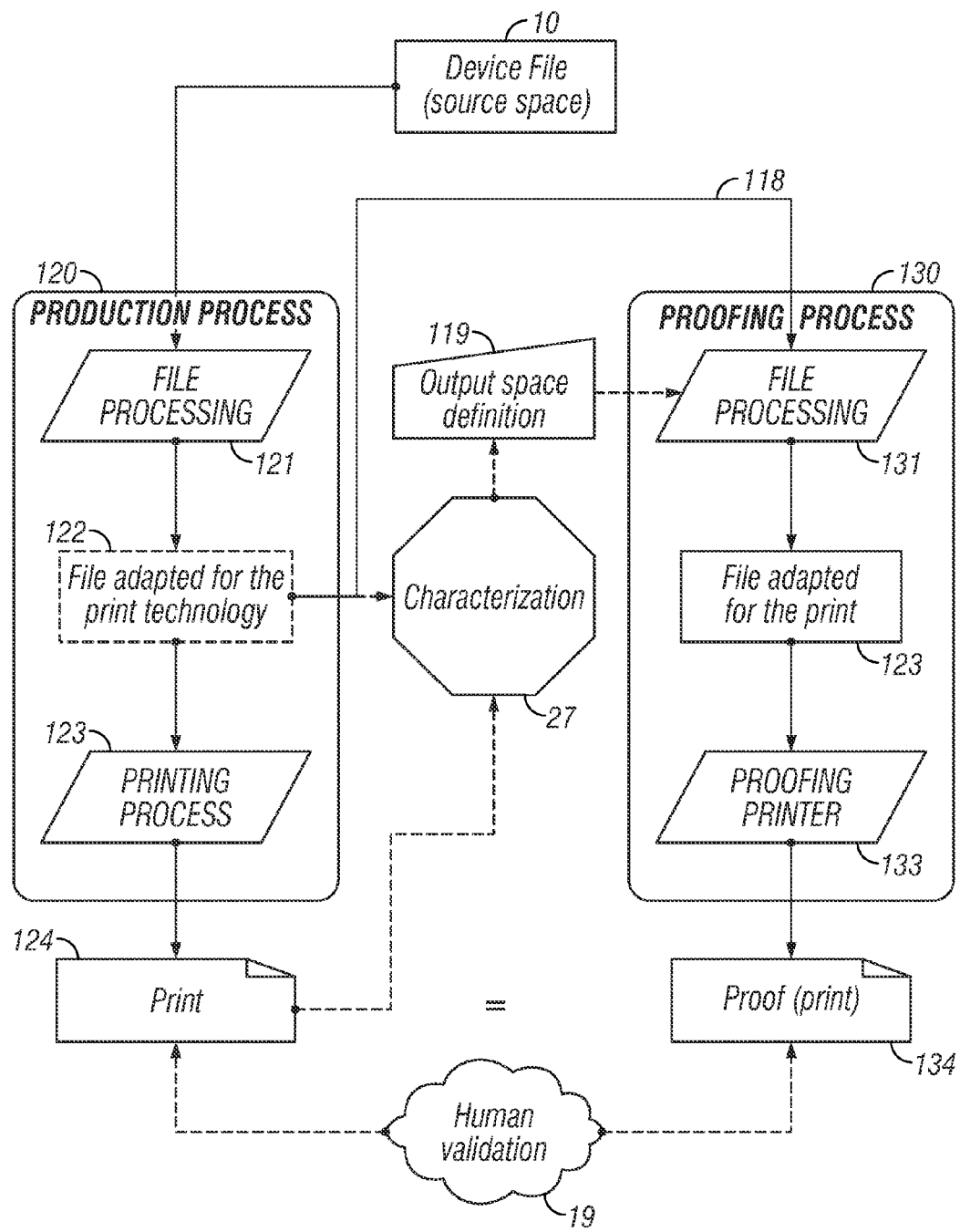
FIG. 7A is a block schematic diagram that shows a standard proofing process according to the invention.
Figure 7B:
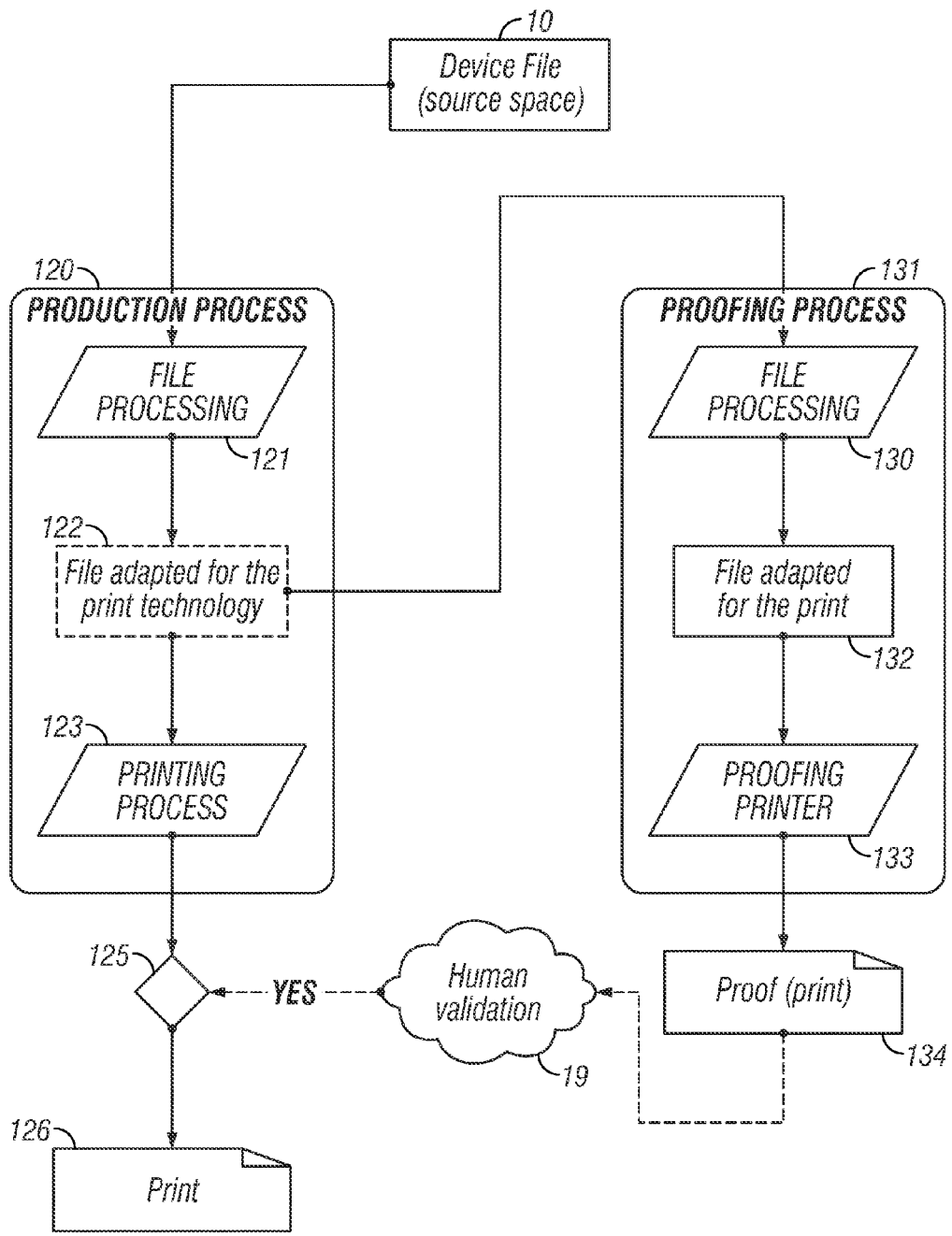
FIG. 7B is a block schematic diagram that shows validation before production in a standard proofing process according to the invention.

FIG. 7A is a block schematic diagram that shows a standard proofing process according to the invention; and FIG. 7B is a block schematic diagram that shows validation before production in a standard proofing process according to the invention.

In FIG. 7A, a device file in source space 10 is provided to a production process 120, which performs operations of file processing 121, adapting the file for the print technology 122, and printing 123, resulting in a print 124. When the file is adapted for the printing process and after the print is made, a characterization is performed 27 and, based upon an output space definition 119, a proofing process is performed 130.

The proofing process performs file processing 131 based upon the output space definition and the file as adapted for the print technology (118). After file processing, the file is adapted for the print 132 and sent to the proofing printer 133, which produces a proof print 134. Human validation 19 is provided for the print and the proof print.

In FIG. 7B, a device file in source space 10 is provided to a production process 120, which performs operations of file processing 121, adapting the file for the print technology 122, and printing 123.

The proofing process performs file processing 131 based upon the file as adapted for the print technology. After file processing, the file is adapted for the print 132 and sent to the proofing printer 133, which produces a proof print 134. Human validation 19 is provided for the proof print. If the proof print is correct 125, the print is made 126.

Figure 8A:
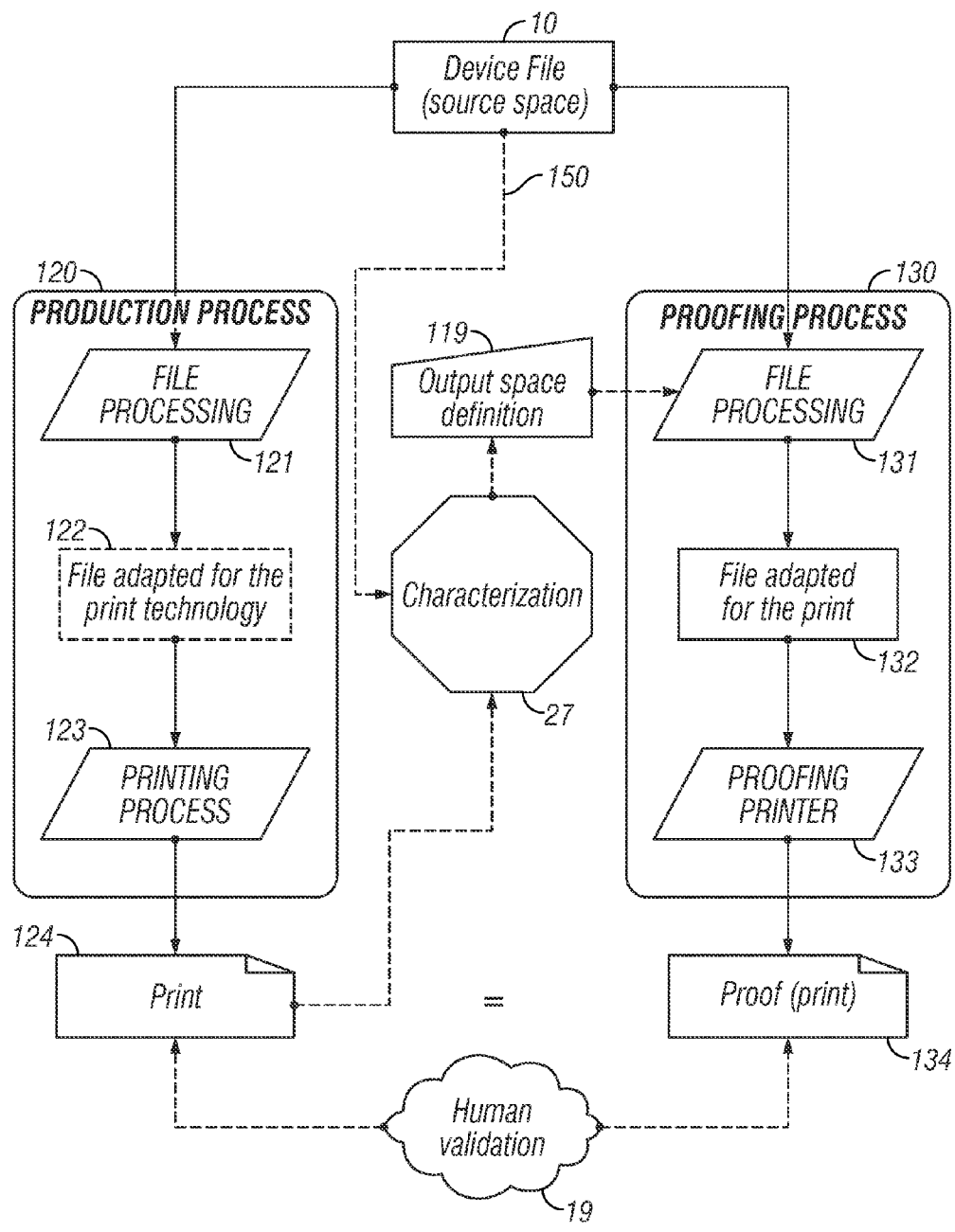
FIG. 8A is a block schematic diagram that shows a predictive proofing process according to the invention.
Figure 8B:
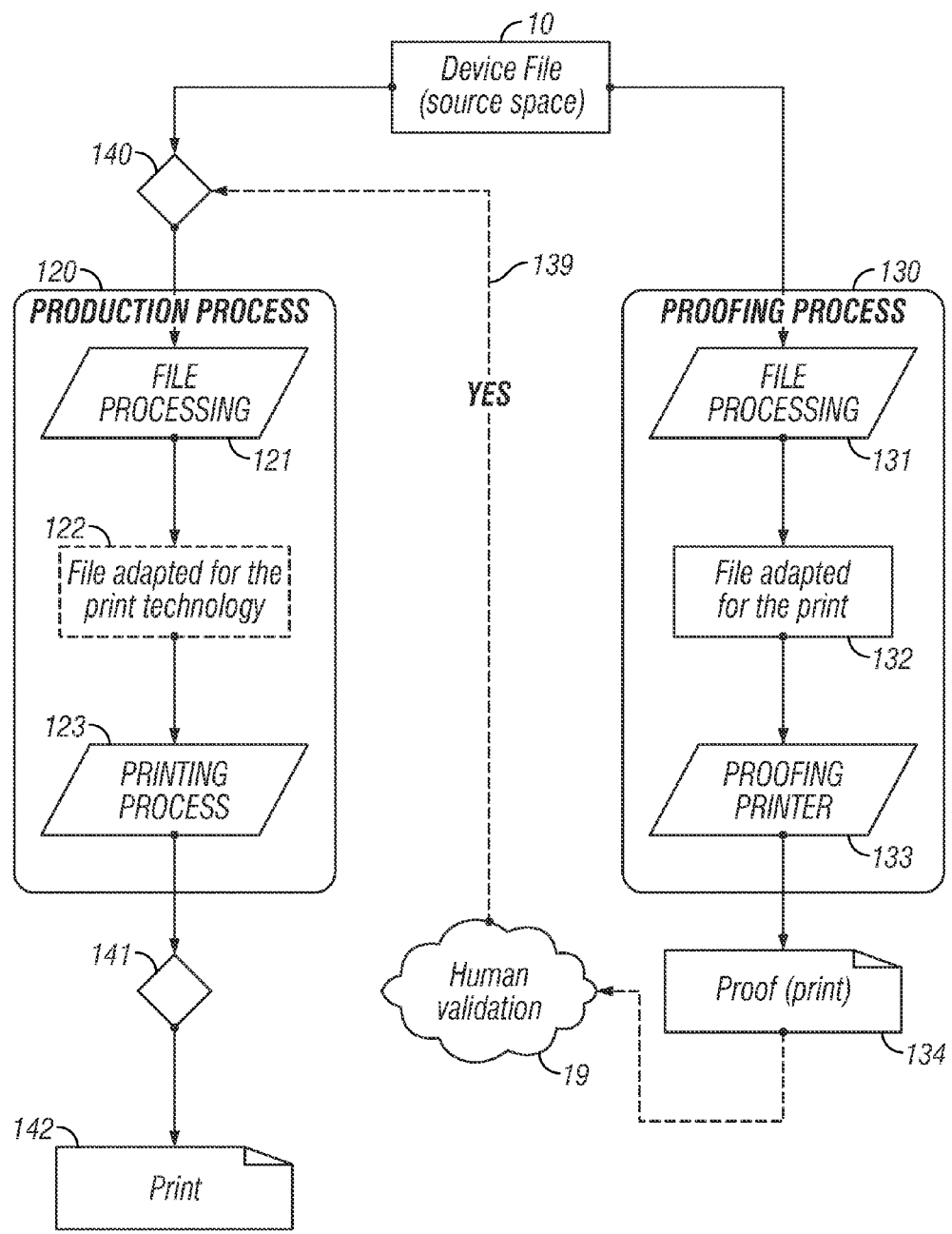
FIG. 8B is a block schematic diagram that shows validation before production in a predictive proofing process according to the invention.

FIG. 8A is a block schematic diagram that shows a predictive proofing process according to the invention; and FIG. 8B is a block schematic diagram that shows validation before production in a predictive proofing process according to the invention.

In FIG. 8A, a device file in source space 10 is provided to a production process 120, which performs operations of file processing 121, adapting the file for the print technology 122, and printing 123, resulting in a print 124. After the print is made, a characterization is performed 27 of the print and the device file (150). The characterization is processed to produce an output space definition 119, after which a proofing process is performed 130.

The proofing process performs file processing 131 based upon the output space definition of the print and the device file. After file processing, the file is adapted for the print 132 and sent to the proofing printer 133, which produces a proof print 134. Human validation 19 is provided for the print and the proof print.

In FIG. 8B, a proofing process 130 performs file processing 131 for the device file in source space 10. After file processing, the file is adapted for the print 132 and sent to the proofing printer 133, which produces a proof print 134. Human validation 19 is provided for the proof print.

Based upon the human validation (139) received at the entry point to a productions process 140, the device file in source space 10 is provided to the production process 120, which performs operations of file processing 121, adapting the file for the print technology 122, and printing 123, resulting in a print 142, if validation is complete 141

In FIG. 6, an embodiment of the invention provides a method for non-destructive visualization of a print file, in which a virtual color space is established 100; color values corresponding to a source file are matched from a known and defined space to a predefined treatment in the virtual color space 102; and a final color result is displayed before altering the file 104.

To get an accurate color display of the final print of a source file, it is necessary to process this file in all stages of color management. For example, visualization in virtual space RGB allows an accurate representation of the final image but requires the availability of software technologies to achieve the necessary conversions of the source file.

In an embodiment of the invention, the color values corresponding to a source from a known and defined space are matched to a predefined treatment. Thus, one can define a virtual profile that has applied to it some treatment. The use of this profile lets one view that treatment on a source file of interest. When a virtual color space profile is modified (or created with a treatment applied), it can be used to proof a source file in a non-destructive way, i.e. without changing the source file itself. Using this definition color, e.g. ICC profile, it is possible to view the final color result before any work on the file. This operation does not require particular expertise or modifying of the information contained in the source files in any way (non-destructive actions), and is therefore very suitable for upstream decision process (Client, Graphic, Decider, etc.).

Multicolor Separation by a Virtual Space Definition

Figure 9:
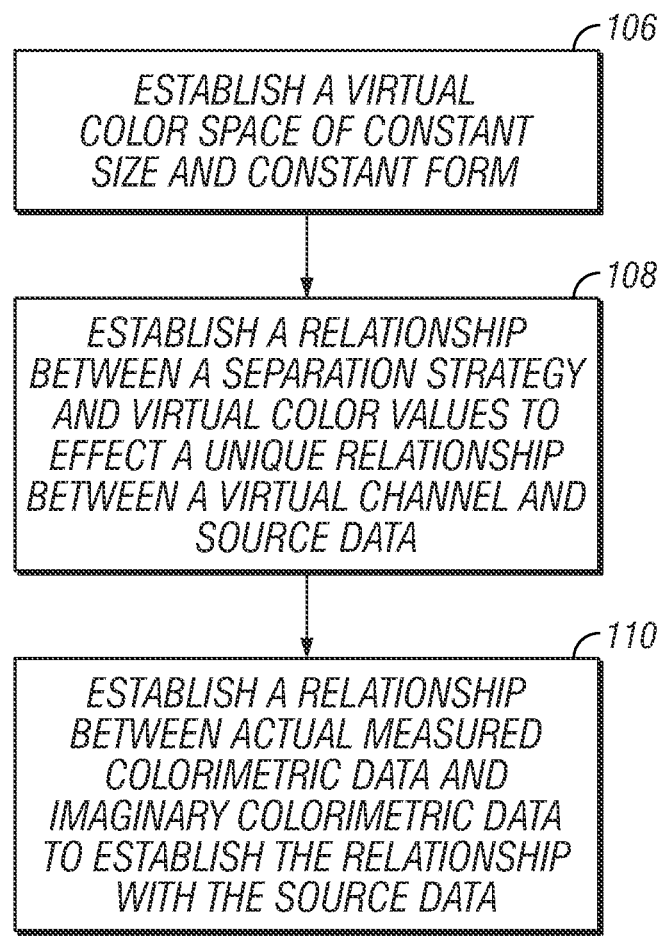
FIG. 9 is a flow diagram that shows multicolor separation by a virtual space definition according to the invention.

FIG. 9 is a flow diagram that shows multicolor separation by a virtual space definition according to the invention. This embodiment of the invention achieves a multicolor separation by use of a color separation strategy (CSS) 43 (see FIG. 1), i.e. to set the relationship between the colors. Such strategy, for example, does not use combinations that are not interesting in terms of color space, e.g. Green mixed with Orange, and limits the ink overprint and total inks to facilitate the drying and the mechanical resistance of printing, e.g. scraping, rubbing, unwanted relief, resistance to the fold, etc.

In FIG. 9, an embodiment of the invention provides a method for multicolor separation of a print file containing source data, in which a virtual color space of constant size and constant form is established 106; a relationship between a separation strategy and virtual color values is established to effect a unique relationship between a virtual channel vLCh (virtual LCh) and source data (n)CLR 108; and a relationship between actual measured colorimetric data and imaginary colorimetric data or virtual type vLCh is established to establish the relationship with the source data 110. As such, the relationship is established by a look-up table (LUT) with interpolation of data between anchor points of the LUT.

Examples of such strategy include:
  Local overlay: avoid overlaying Cyan+Yellow+Green if the resulting hue is achievable by two primary colors instead of three; and
  Total overlay: avoid overlaying the seven primary colors in impressive seven colors, for 700% maximum ink to get the maximum color space in terms of Colorimetry in CIE L*C*h coding within the CIELab space.

Excluding the chromatic adaptation and management of colors that are out of gamut, e.g. all of the values that must be separated are in gamut, there is a unique relationship between a color of type CIELab, XYZ, or equivalent and space (n) dimension. The use of an encoding of type LCh (Lightness/clarity-Chroma/Saturation-hue/tint) is in compliance with a representation of color space and can result from a number of decisions based upon experience or from analysis of colorimetric data.

One problem concerns the fact that when a color source is working from data (coded L*C*h), it has an area of variable and non-constant size and generally much larger than the gamut of the nCLR device space, following the pigment inks, color support, etc. It is difficult to establish relationships of colors if the dimension of the space and its form is constantly variable. Accordingly, embodiments of the invention create a color space abstract (virtual) which remains of constant size and constant form and better fits to the gamut of the device space. For example, where:

Saturation is coded from 0 to 100 saturated shades as weakly saturated. All the printed colors are quantified in Saturation between 0 to 100, never more, never less, where 0 is non-saturation or most weakly saturated and 100 is maximum saturation; and The Lightness of 0 to 100 unchanged from LCh hue of 0 to 360° angle. All the printed colors are quantified in Lightness between 0 to 100, even if the substrate is non-white or/and if the darkest color is not so dark. Thus, in vLCh, L is always between 0 to 100. The Darkest value is always 0, and the Lightest value is always 100.

The invention thus establishes a relationship between the strategy of separation and the virtual color values (stable) and can therefore establish algorithmically a unique relationship between the vLCh (virtual LCh) and data (n)CLR. It is then necessary to establish a relationship ["3D to 3D"] between the actual measured (CIELab) colorimetric data and imaginary colorimetric data (or virtual type vLCh) to establish the relationship with the source data. This relationship could be established by a LUT with interpolation of the data between the anchor points of the LUT. A 3D/3D LUT is therefore optimal in terms of precision/size/time, easy to achieve, and requires only one data source, and does not require management of multiple (n)-dimension space-induced combinations. This vLCh space also has a single match ["3D to 3D"] with the virtual editing space regardless of size.

Benefits of this approach include relating the strategy of color separation to the attainable color space by the combination of inks, media, print settings, and color relevant process conditions, e.g. the kiln process, lamination, etc. It is relative because it is insensitive to the values of the colors themselves. For example, there can be a CSS between the vLCh and seven CLR inks, e.g. C, M, Y, K, O, Green, Blue, from the same virtual space. Values CIELab/XYZ necessary for the accurate calibration and matching of color from the mixture of these seven inks on a matte white surface are different from the CIELab values/XYZ obtained by mixing these seven inks on a glossy media with yellowish tone. This does not change the vLCh to 7CLR relationship, but only changes the CIELab for the matte print media to vLCh and the CIELab relationship for the brilliant cream base to vLCh. It is straightforward to make or remake the calibration, while being assured that the strategy of separation is rigorously identical. Calibration, i.e. the relationship to vLCh CIELab, is also simplified because it is not necessary to print a sample of all possible combinations of the nCLR space, but only to print the combinations defined by the relationship vLCh and (n)CLR.

If one considers that constant accuracy is not in %, then the number of combinations to print based on the number of dimension of the space yields the Table 1 below. Table 2 below shows image resolution in accordance with a number of colors or dimensions of the color space.

TABLE 1

Number of colors (or dimension of the space)

| step | % | 3 | 4 | 5 | 6 | 7 | 8 | 9 | 10 |
|---|---|---|---|---|---|---|---|---|---|
| 2 | 100 | 8 | 16 | 32 | 64 | 128 | 256 | 512 | 1 024 |
| 5 | 25 | 125 | 625 | 3 125 | 15 625 | 78 125 | 4E+05 | 2E+06 | 1E+07 |
| 11 | 10 | 1E+03 | 1E+04 | 2E+05 | 2E+06 | 2E+07 | 2.14E+08 | 2E+09 | 2.59E+10 |

TABLE 2

Resolution number of colors (or dimension of the space)

| Chart | 3 | 4 | 5 | 6 | 7 | 8 | 9 | 10 |
|---|---|---|---|---|---|---|---|---|
| 1331 | 10.0% | 19.8% | 31.1% | 43.2% | 55.7% | 68.6% | 81.7% | 95.0% |
| 2000 | 8.6% | 17.6% | 28.0% | 39.2% | 51.0% | 63.1% | 75.4% | 87.8% |

Because an A4 sheet, e.g. maximum measurable size by an automated device, can contain approximately 1500 to 2000 spots to the maximum, it can be seen that 1331 spots ensures an accuracy for step variation of 10% for a 3D space; and 1331 spots ensures an accuracy for step variation of ≈69% for a space 8D, $1/7^{th}$. To have a resolution similar to that of a 3D space, one should print and measure 214 million spots. It is therefore impossible to guarantee identical precision for 8CLR to that of a 3CLR print without the use of a virtual space 3D vLCh. But vLCh space is still in a 3D management space, and therefore optimal in terms of accuracy/performance/low size of the calibration range.

For greater than three dimensions, management becomes complex and expensive with regard to the number of combinations to manage (data volume, time of processing, etc.). The increase in the number of data also increases the noise in the template data, and leads to inaccuracies and visible artifacts. The state of the art solution is to lower the accuracy by, e.g. reducing the number of grid points per dimension in a LUT. The use of the real color space is not convenient because of the variable size in terms of clarity and saturation. Thus, by creating an imaginary or virtual color space that has all the desired qualities, such as fixed dimension, of the real space resolution, etc., one can easily fix the strategy of separation algorithmically between this virtual space and the dimensions in (n) output channels.

In a situation of calibration from the real space, rules are built manually or algorithmically to govern the relationship between the imaginary space and space (n) D. The calibration range is built in the 3D imaginary space. This 3D range is converted to (n)D by various rules. The file (n)D is printed for colors in 3D real-time measurement. A correspondence is established between colorimetric values in real 3D and imaginary 3D space vLCh. This allows mapping the real space to the imaginary (3D to 3D) space and imaginary 3D space to (n)D in accordance with the aforementioned rules for printing and determining the desired 3D values.

Formulae for Table 1:

$$\text{NberComb} = (\text{Steps})^{SpaceDim} \tag{1}$$

where:
NberComb=the number of combinations;
Steps=the number of nodes in the space (equal distance), e.g. Steps 3=0, 50, 100%;
SpaceDim=space dimension (3 to n)

$$\text{Steps \%} = \left(\left(10^{\left(\frac{\log(NberComb)}{SpaceDim}\right)}\right) - 1\right)^{-1} \tag{2}$$

where:
Steps %=step in % of each node in the space (equal distance).

Proof Before Post-Printing Operation

Figure 10:
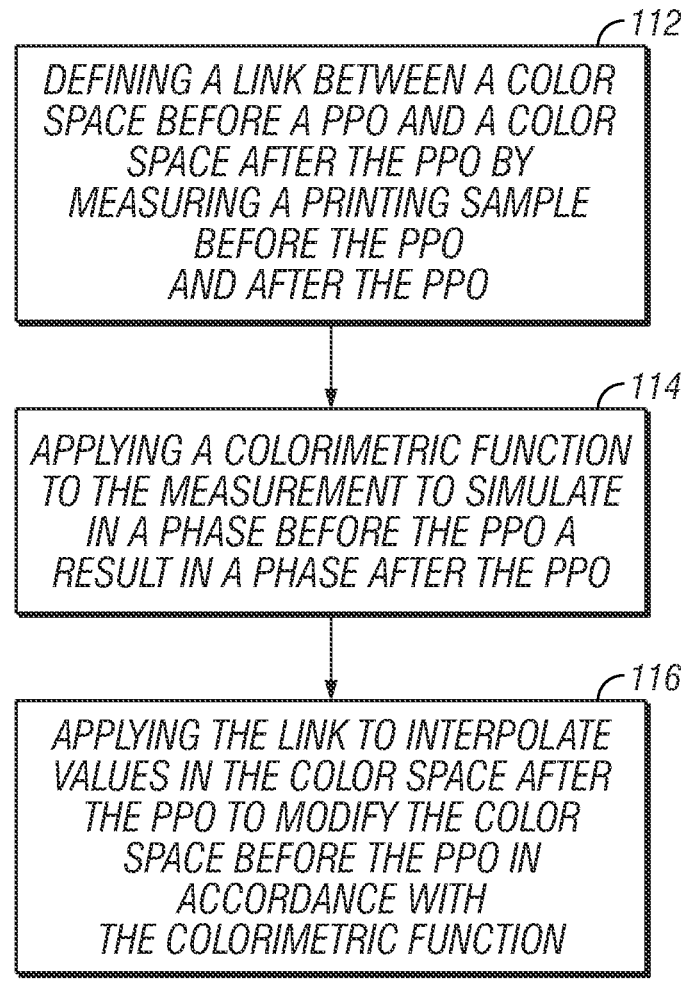
FIG. 10 is a flow diagram that shows a proof before post-printing operation according to the invention.

FIG. 10 is a flow diagram that shows a proof before post-printing operation according to the invention. An embodiment of the invention measures the result expected after printing, but before any PPO, and creates a color definition, similar to an ICC profile, to show and proof the result. This allows the customer and printer operator to decide if the production could be validated before the PPO. In an embodiment, the link between the color space before the PPO and after the PPO is defined by measuring the printing sample before and after PPO. A colorimetric function is applied to the data measured to simulate the phase before and after the PPO, for example to simulate saturation and/or increasing or decreasing contrast, yellowish variation of the media, etc. A modification of the colorimetric values is then applied by interpolation in a color space, e.g. Lab, XYZ, spectral reflectance, density, etc.

In the embodiment of the invention in FIG. 10, a method for establishing a proof before a post-printing operation (PPO) is shown, in which a processor defines a link between a color space before the PPO and a color space after the PPO by measuring a printing sample before the PPO and after the PPO 112; the processor applies a colorimetric function to the measurement to simulate in a phase before the PPO a result in a phase after the PPO 114; and the processor applies the link to interpolate values in the color space after the PPO to modify the color space before the PPO in accordance with the colorimetric function 116.

Computer Implementation

Figure 11:
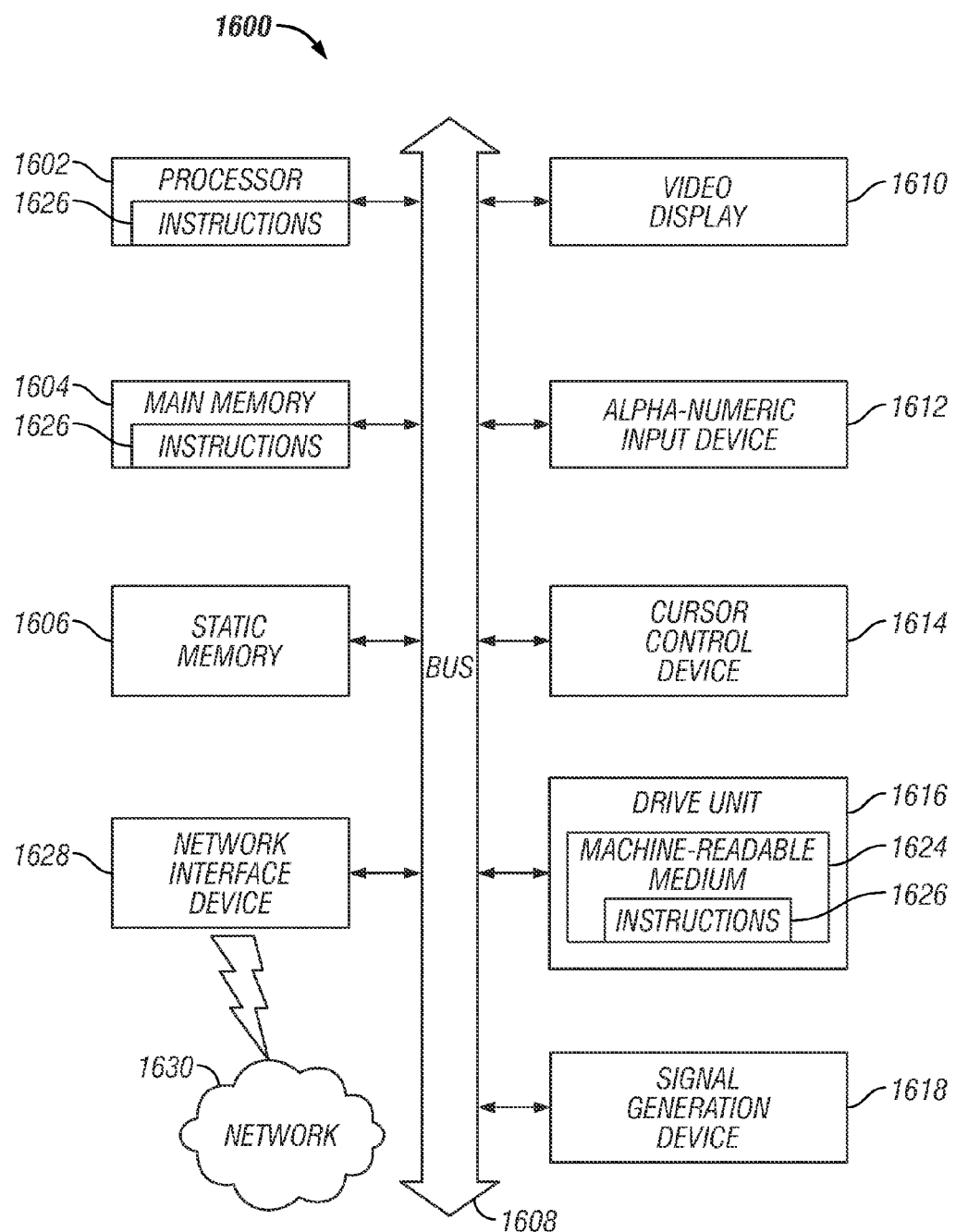
FIG. 11 is a block schematic diagram that depicts a machine in the exemplary form of a computer system within which a set of instructions for causing the machine to perform any of the herein disclosed methodologies may be executed.

FIG. 11 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for visualizing a dedicated ink layer in a color comprised of two or more inks, comprising:
   establishing a virtual color space comprising a virtual workspace between a first color space and a printing space having n data size and a percent color separation, wherein the percent of each color in the printing space is equivalent to a single virtual color having separation values required to obtain an expected color rendering before separation into separate layers for printing, and wherein a change of a percent effects a display of a resulting color rendering;
   generating, using said virtual color space, one or more virtual color profiles each of which only contains color values relative to one of said two or more inks;
   selecting one of said one or more virtual color profiles;
   displaying said selected virtual color profile in said virtual color space in relation to said color;
   wherein adjustment of said selected profile displays a visualization of said ink as modified by said adjustment; and
   establishing a proof before a post-printing operation (PPO), comprising:
      a processor defining a link between a color space before said PPO and a color space after said PPO by measuring a printing sample before said PPO and after said PPO and applying said link to said color space before said PPO during a subsequent printing process.

2. A method for non-destructive visualization of a print file, comprising:
   establishing a virtual color space comprising a virtual workspace between a first color space and a printing space having n data size and a percent color separation, wherein the percent of each color in the printing space is equivalent to a single virtual color having separation values required to obtain an expected color rendering before separation into separate layers for printing, and wherein a change of a percent effects a display of a resulting color rendering;
   modifying a particular virtual color space profile to create a predefined treatment;
   matching one or more color values corresponding to a source file from a known and defined space to said predefined treatment in said virtual color space;
   displaying, by using said modified virtual color space profile, a final color result corresponding to said matched one or more color values, before altering said file; and
   establishing a proof before a post-printing operation (PPO), comprising:
      a processor defining a link between a color space before said PPO and a color space after said PPO by measuring a printing sample before said PPO and after said PPO and applying said link to said color space before said PPO during a subsequent printing process.

* * * * *